(12) United States Patent
Kuribara

(10) Patent No.: US 11,948,607 B2
(45) Date of Patent: Apr. 2, 2024

(54) DISK DEVICE

(71) Applicants: Kabushiki Kaisha Toshiba, Tokyo (JP); Toshiba Electronic Devices & Storage Corporation, Tokyo (JP)

(72) Inventor: Hirofumi Kuribara, Chuo Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/117,603

(22) Filed: Mar. 6, 2023

(65) Prior Publication Data

US 2023/0420003 A1 Dec. 28, 2023

(30) Foreign Application Priority Data

Jun. 28, 2022 (JP) ................. 2022-103686

(51) Int. Cl.
| | |
|---|---|
| *G11B 33/14* | (2006.01) |
| *G11B 5/48* | (2006.01) |
| *G11B 19/20* | (2006.01) |
| *G11B 25/04* | (2006.01) |

(52) U.S. Cl.
CPC .......... *G11B 33/146* (2013.01); *G11B 5/4813* (2013.01); *G11B 19/2018* (2013.01); *G11B 25/043* (2013.01)

(58) Field of Classification Search
None
See application file for complete search history.

(56) References Cited

U.S. PATENT DOCUMENTS

| | | | | |
|---|---|---|---|---|
| 4,780,776 | A | | 10/1988 | Dushkes |
| 5,805,386 | A | * | 9/1998 | Faris ................. G11B 5/5526 |
| 5,956,203 | A | | 9/1999 | Schirle et al. |
| 6,826,009 | B1 | * | 11/2004 | Scura ................ G11B 33/146 |
| | | | | 360/97.16 |
| 8,638,525 | B1 | | 1/2014 | Sugii |
| 9,666,235 | B2 | * | 5/2017 | Jabbari ............. B01D 46/0041 |
| 10,446,177 | B1 | * | 10/2019 | Suzuki ............... G11B 25/043 |
| 10,510,378 | B1 | * | 12/2019 | Ma ..................... G11B 25/043 |

(Continued)

FOREIGN PATENT DOCUMENTS

| | | | | |
|---|---|---|---|---|
| JP | 2022148046 | A | * 10/2022 | ............. G11B 5/012 |
| JP | 2023-011351 | A | 1/2023 | |

*Primary Examiner* — William J Klimowicz
(74) *Attorney, Agent, or Firm* — Allen & Overy LLP

(57) ABSTRACT

According to one embodiment, a disk device includes rotatable magnetic disks, a first actuator assembly rotatably supported on a pivot through a first bearing unit, a second actuator assembly rotatably supported on the pivot through a second bearing unit and provided side by side with the first actuator assembly in an axial direction of the pivot, and a filter unit provided between the magnetic disks and the first and second actuator assemblies. The filter unit includes a holder including a shielding portion facing a boundary portion between the first actuator assembly and the second actuator assembly and a ventilation opening provided at a position spaced apart from the boundary portion in the axial direction, and a filter held by the holder and facing the ventilation opening.

8 Claims, 10 Drawing Sheets

(56) References Cited

U.S. PATENT DOCUMENTS

| | | | |
|---|---|---|---|
| 2005/0195523 A1* | 9/2005 | Abe | B03C 3/155 |
| | | | 360/97.18 |
| 2007/0025015 A1* | 2/2007 | Suwa | G11B 33/146 |
| 2008/0068746 A1* | 3/2008 | Kaneko | G11B 33/148 |
| 2010/0246059 A1* | 9/2010 | Shimizu | G11B 33/148 |
| 2022/0310115 A1* | 9/2022 | Tukada | G11B 5/012 |
| 2023/0010930 A1 | 1/2023 | Okamoto et al. | |

* cited by examiner

DISK DEVICE

CROSS-REFERENCE TO RELATED APPLICATIONS

This application is based upon and claims the benefit of priority from Japanese Patent Application No. 2022-103686, filed Jun. 28, 2022, the entire contents of which are incorporated herein by reference.

FIELD

Embodiments described herein relate generally to a disk device.

BACKGROUND

As a disk device, for example, a hard disk drive (HDD) includes a magnetic disk disposed in a housing, a spindle motor which supports and rotationally drives the magnetic disk, an actuator assembly which supports and moves a magnetic head, and the like.
The actuator assembly includes an actuator block rotatably supported on a pivot through a bearing, a plurality of arms extending from the actuator block, and a suspension assembly attached to each arm. The bearing is filled with a lubricant such as grease in order to reduce friction and wear.

In recent years, as the storage capacity of HDDs has increased, the number of installed magnetic disks has also increased. In order to support a large number of magnetic disks, a so-called multi-actuator assembly in which a plurality of, for example, two actuator assemblies are laminated and arranged has been proposed. In the multi-actuator assembly, two unit bearings are arranged to overlap each other in an axial direction.

During a seek operation of the actuator assembly, contamination of a mist component, a gas component, or the like of grease may be scattered to the outside from the bearing. In the case of the multi-actuator assembly, since a grease scattering portion (gap) exists between two unit bearings, there is a possibility that grease scattering from the bearings increases. The scattered mist component and gas component may be carried onto the magnetic disk by the air flow generated by the rotation of the magnetic disk and adhere to the surface of the magnetic disk or the magnetic head. When the grease adheres to the magnetic disk and the magnetic head, insufficient flying or head crash of the magnetic head occurs, which may cause problems such as data read/write failure.

DETAILED DESCRIPTION

Figure 1:
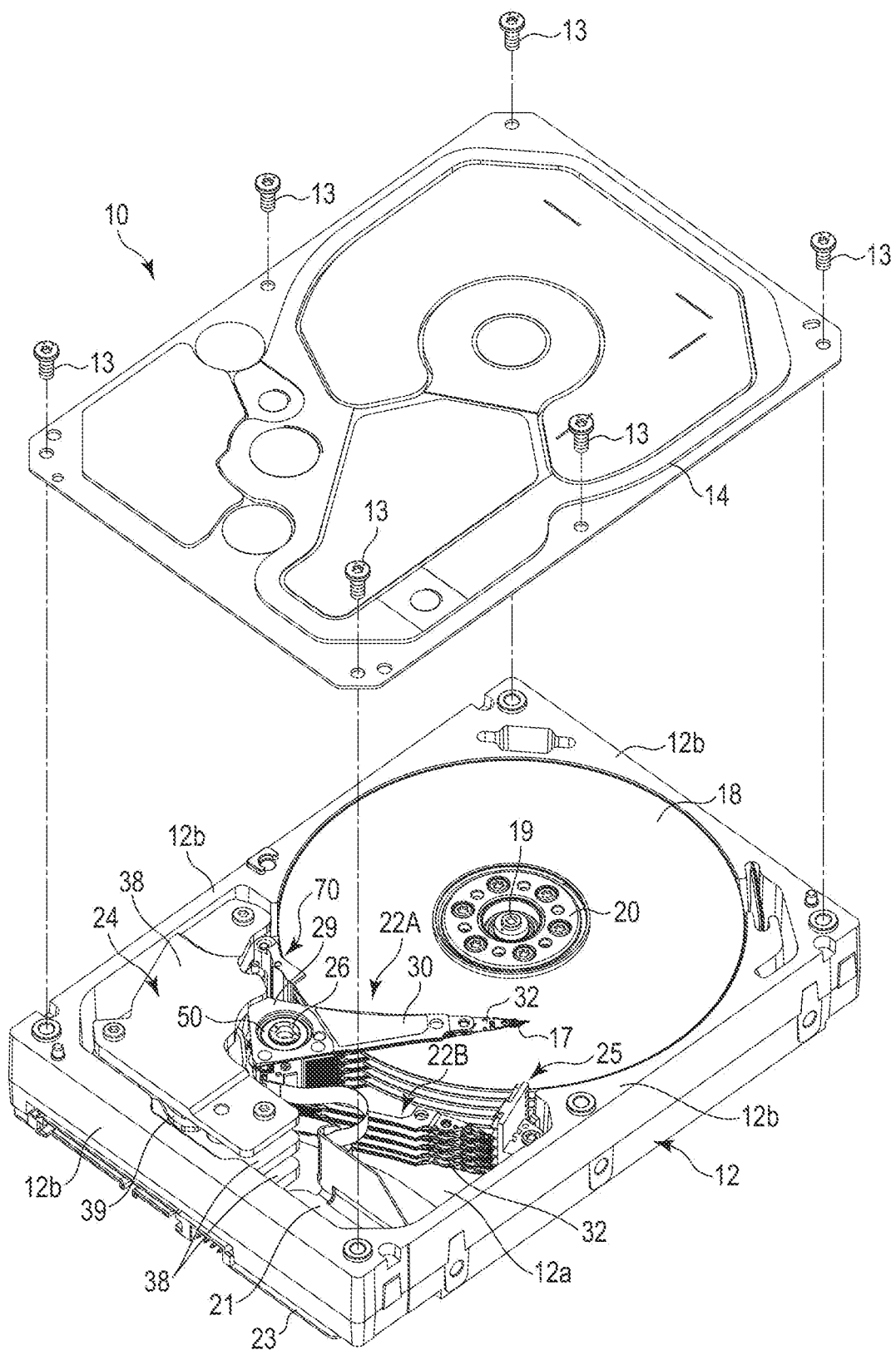
FIG. 1 is an exploded perspective view illustrating a top cover of a hard disk drive (HDD) according to a first embodiment.

Various embodiments will be described hereinafter with reference to the accompanying drawings.

In general, according to one embodiment, a disk device comprises: a plurality of rotatable magnetic disks; a first actuator assembly which is rotatably supported on a pivot through a first bearing unit; a second actuator assembly which is rotatably supported on the pivot through a second bearing unit and provided side by side with the first actuator assembly in an axial direction of the pivot; and a filter unit which is provided between the magnetic disks and the first and second actuator assemblies. The filter unit comprises a holder including a shielding portion facing a boundary portion between the first actuator assembly and the second actuator assembly and a ventilation opening provided at a position spaced apart from the boundary portion in the axial direction, and a filter held by the holder and facing the ventilation opening.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

As a disk device, a hard disk drive (HDD) according to a first embodiment will be described in detail. FIG. 1 is an exploded perspective view of the HDD according to the first embodiment in which a top cover is removed.

The HDD includes a flat housing 10 having a substantially rectangular shape. The housing 10 includes a rectangular box-shaped base 12 having an open upper surface, and a top cover 14. The top cover 14 is screwed to the base 12 with a plurality of screws 13 to close the upper end opening of the base 12. The base 12 has a rectangular bottom wall 12a which faces the top cover 14 with a gap, and a side wall 12b which is provided upright along the periphery of the bottom wall 12a, and, for example, is integrally molded of aluminum. The top cover 14 is formed of, for example, stainless steel into a rectangular plate shape.

A plurality of, for example, nine magnetic disks 18 as recording media and a spindle motor 19 as a drive unit for supporting and rotating the magnetic disks 18 are provided in the housing 10. The spindle motor 19 is disposed on the bottom wall 12*a*. Each magnetic disk 18 has a magnetic recording layer on an upper surface and/or a lower surface. The magnetic disk 18 is coaxially fitted to a hub (not illustrated) of the spindle motor 19 and is clamped by a clamp spring 20 to be fixed to the hub. The magnetic disk 18 is supported in the state of being positioned substantially in parallel with the bottom wall 12*a* of the base 12. The plurality of magnetic disks 18 is rotated at a predetermined rotation speed by the spindle motor 19. Note that the number of magnetic disks is not limited to nine, and may be eight or less, or ten or more.

A plurality of magnetic heads 17 for recording and reading information on the magnetic disk 18 and a head actuator assembly movably supporting the magnetic heads 17 with respect to the magnetic disk 18 are provided in the housing 10. In this embodiment, the head actuator assembly is configured as a multi-actuator assembly which has a plurality of actuator assemblies, for example, a first actuator assembly 22A and a second actuator assembly 22B. The first and second actuator assemblies 22A and 22B are rotatably supported around a common support shaft (pivot) 26.

A voice coil motor (VCM) 24 which rotates and positions the first and second actuator assemblies 22A and 22B, a ramp load mechanism 25 which holds the magnetic head 17 at an unload position apart from the magnetic disk 18 when the magnetic head 17 moves to the outermost periphery of the magnetic disk 18, and a board unit (FPC unit) 21 on which electronic components such as a conversion connector are mounted are provided inside the housing 10. Furthermore, a filter unit 70 is provided between the outer periphery of the magnetic disk 18 and the first and second actuator assemblies 22A and 22B. The filter unit 70 is installed on the bottom wall 12*a*.

A printed circuit board 23 is screwed to the outer surface of the bottom wall 12*a*. The printed circuit board 23 configures a control unit, and this control unit controls the operation of the spindle motor 19 and controls the operation of the VCM 24 and the magnetic head 17 through the board unit 21.

Figure 2:
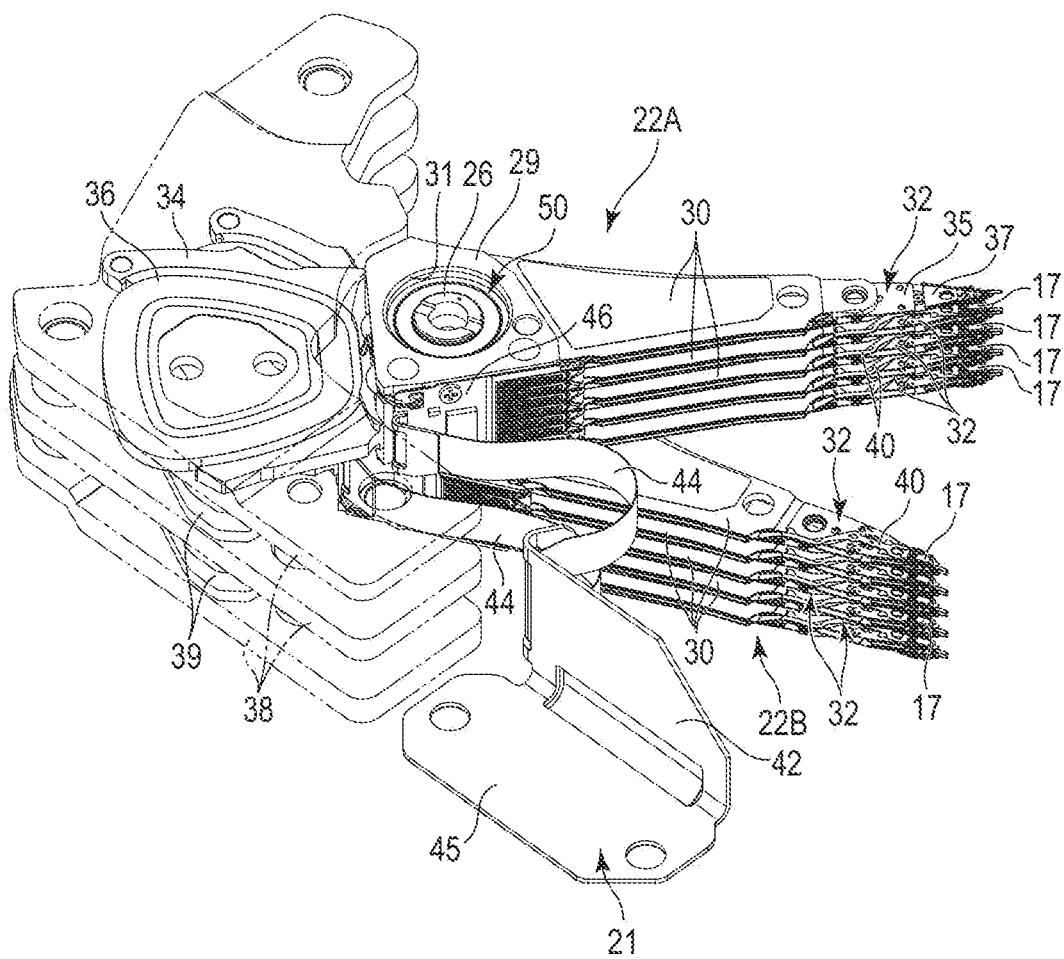
FIG. 2 is a perspective view illustrating an actuator assembly and a board unit of the HDD.
Figure 3:
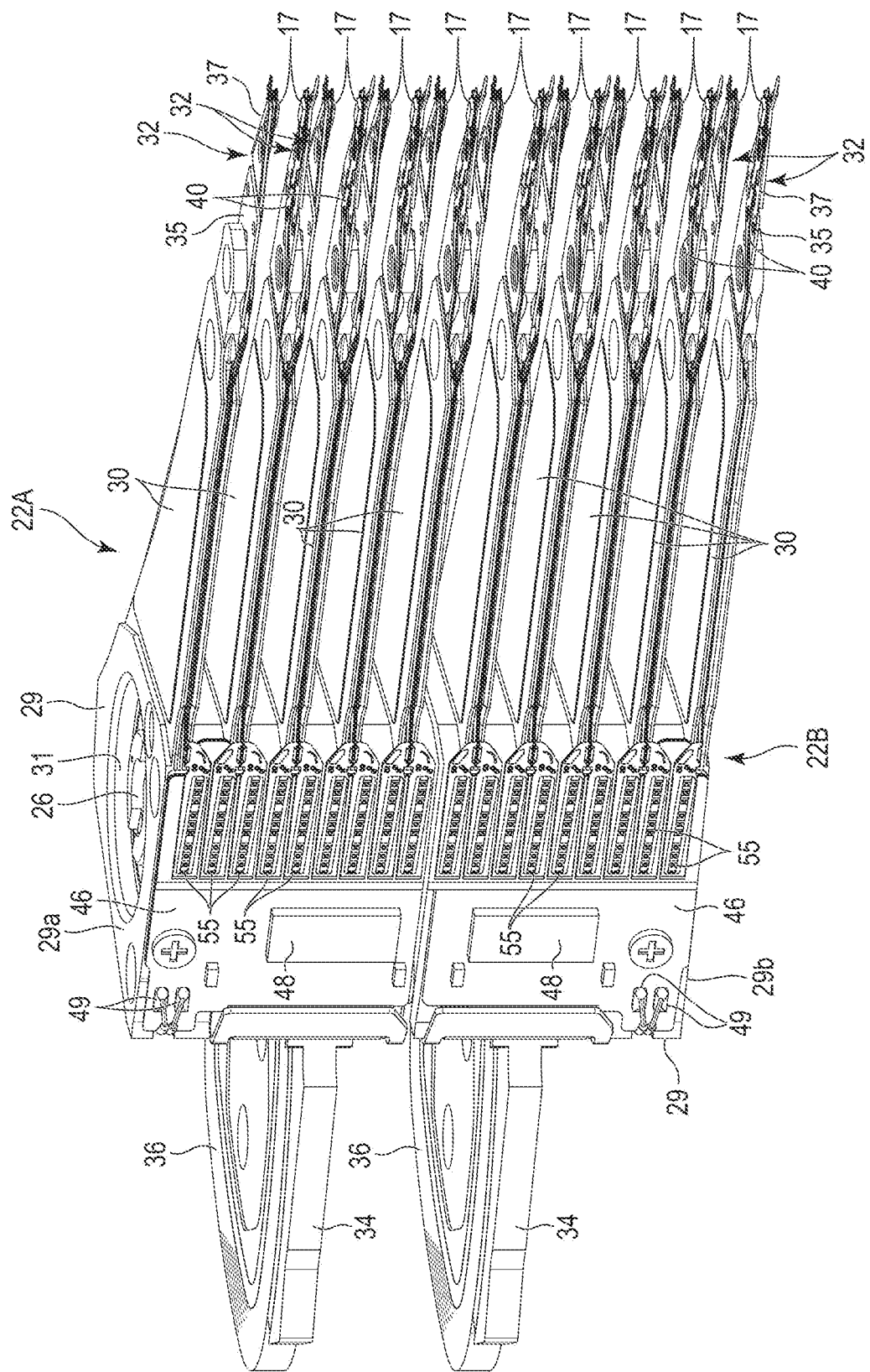
FIG. 3 is a perspective view of the actuator assembly in an aligned state.

FIG. 2 is a perspective view illustrating the multi-actuator assembly and the FPC unit, and FIG. 3 is a perspective view of the multi-actuator assembly in an aligned state.

As illustrated in FIGS. 2 and 3, the multi-actuator assembly has the first actuator assembly 22A and the second actuator assembly 22B. The first and second actuator assemblies 22A and 22B are arranged to overlap each other, and are provided to be rotatable independently of each other around a common support shaft 26 provided upright on the bottom wall 12*a* of the base 12. The first actuator assembly 22A and the second actuator assembly 22B have substantially the same structure. In an example, the actuator assembly arranged on the upper side is referred to as the first actuator assembly 22A, and the actuator assembly arranged on the lower side is referred to as the second actuator assembly 22B.

The first actuator assembly 22A includes an actuator block (first actuator block) 29, five arms 30 extending from the actuator block 29, head suspension assemblies (which may be referred to as head gimbal assemblies (HGA)) 32 attached to respective arms 30, and magnetic heads 17 supported by the head suspension assemblies. The actuator block 29 has an inner hole 31, and a bearing unit (unit bearing) 50 is housed in the inner hole 31. The actuator block 29 is rotatably supported by the support shaft 26 by the bearing unit 50.

In this embodiment, the actuator block 29 and the five arms 30 are integrally molded of aluminum or the like to form a so-called E block. The arm 30 is, for example, formed in an elongated flat plate shape and extends from the actuator block 29 in a direction orthogonal to the support shaft 26. The five arms 30 are provided in parallel with each other with a gap therebetween.

The first actuator assembly 22A includes a support frame 34 extending from the actuator block 29 in the direction opposite to the arm 30. A voice coil 36 is supported by the support frame 34. As illustrated in FIGS. 1 and 2, the voice coil 36 is positioned between a pair of yokes 38 installed on the base 12, and configures the VCM 24 together with the yokes 38 and the magnet 39 fixed to any one of the yokes 38.

As illustrated in FIGS. 2 and 3, the first actuator assembly 22A includes nine head suspension assemblies 32, and the head suspension assemblies 32 are attached to the extension ends of the arms 30, respectively. The plurality of head suspension assemblies 32 include up-head head suspension assemblies which support the magnetic heads 17 upward and down-head head suspension assemblies which support the magnetic heads 17 downward.

The nine head suspension assemblies 32 extend from the five arms 30 and are arranged substantially parallel with each other and at predetermined intervals. Each suspension assembly 32 includes a substantially rectangular base plate 35 fixed to the arm 30, an elongated leaf spring-shaped load beam 37, and an elongated strip-shaped flexure (wiring member) The proximal end portion of the load beam 37 is fixed to the end portion of the base plate 35 in an overlapping manner. The load beam 37 extends from the base plate 35 and is formed to be tapered toward the extension end. The base plate 35 and the load beam 37 are formed of stainless steel, for example.

The flexure 40 is attached on the surfaces of the load beam 37 and the base plate 35, and further extends outward from the side edge of the base plate 35 to the proximal end portion (actuator block 29) of the arm 30 along the arm 30. A displaceable gimbal portion (elastic support portion) is provided at a distal end portion of the flexure 40 positioned on the load beam 37, and the magnetic head 17 is mounted on the gimbal portion. The wiring of the flexure 40 is electrically connected to the magnetic head 17.

The flexure 40 has a connection end portion 55 provided at the extension end. The connection end portion 55 is provided with a plurality of connection terminals. The connection end portion 55 is joined to an FPC (described later) installed on the side surface of the actuator block 29.

The second actuator assembly 22B is configured similarly to the first actuator assembly 22A. The actuator block (second actuator block) 29 of the second actuator assembly 22B is rotatably supported by the support shaft 26 through the bearing unit 50. The actuator block 29 is supported by the proximal end portion (half portion on the bottom wall 12*a* side) of the support shaft 26, and is coaxially arranged below the first actuator block 29. The actuator block (second actuator block) 29 faces the first actuator block 29 with a slight gap.

The voice coil 36 of the second actuator assembly 22B is positioned between the pair of yokes 38 installed on the base 12, and configures the VCM 24 together with the yokes 38 and the magnet 39 fixed to any one of the yokes.

As illustrated in FIG. 3, the support frame 34 and the voice coil 36 of the first actuator assembly 22A face the support frame 34 and the voice coil 36 of the second actuator assembly 22B substantially in parallel with each other at an interval in an axial direction. A boundary or a gap between the first actuator block 29 and the second actuator block 29 is positioned between two sets of support frames 34 and the voice coils 36.

As illustrated in FIG. 2, the FPC unit 21 integrally includes a base portion 42 having a substantially rectangular shape, two elongated strip-shaped relay portions 44 extending from one side edge of the base portion 42, and two joint portions (a first wiring board and a second wiring board) 46 provided continuously to the respective distal ends of the relay portions 44. The base portion 42, the relay portion 44, and the joint portion 46 are formed by a flexible printed wiring board (FPC). The flexible printed wiring board includes an insulating layer such as polyimide, a conductive layer which is formed on the insulating layer and forms wirings, connection pads, and the like, and a protective layer which covers the conductive layer.

Electronic components such as a conversion connector and a plurality of capacitors (not illustrated) are mounted on the base portion 42 and electrically connected to wirings (not illustrated). A metal plate 45 functioning as a reinforcing plate is attached to the base portion 42. The base portion 42 is installed on the bottom wall 12a of the base 12. The two relay portions 44 extend from the side edge of the base portion 42 toward the first and second actuator assemblies 22A and 22B. The joint portion 46 provided at the extension end of the relay portion 44 is attached to one side surface (installation surface) of each of the first and second actuator blocks 29, and is further screwed and fixed to the installation surface by a fixing screw.

As illustrated in FIGS. 2 and 3, the connection end portion 55 of the flexure 40 is joined to each joint portion 46, and is electrically connected to the wiring of the joint portion 46. A head IC (head amplifier) 48 is mounted on the joint portion 46, and the head IC 48 is connected to the connection end portion 55 and the base portion 42 through wiring. Further, the joint portion 46 includes the connection pad 49 to which the voice coil 36 is connected. Each of the nine magnetic heads 17 of the first actuator assembly 22A is electrically connected to the base portion 42 through the wiring of the flexure 40, the connection end portion 55, the joint portion 46 of the FPC unit 21, and the relay portion 44. Similarly, each of the nine magnetic heads 17 of the second actuator assembly 22B is electrically connected to the base portion 42 through the wiring of the flexure 40, the connection end portion 55, the joint portion 46 of the FPC unit 21, and the relay portion 44. Further, the base portion 42 is electrically connected to the printed circuit board 23 on the bottom surface side of the housing 10 through the conversion connector.

Figure 4:
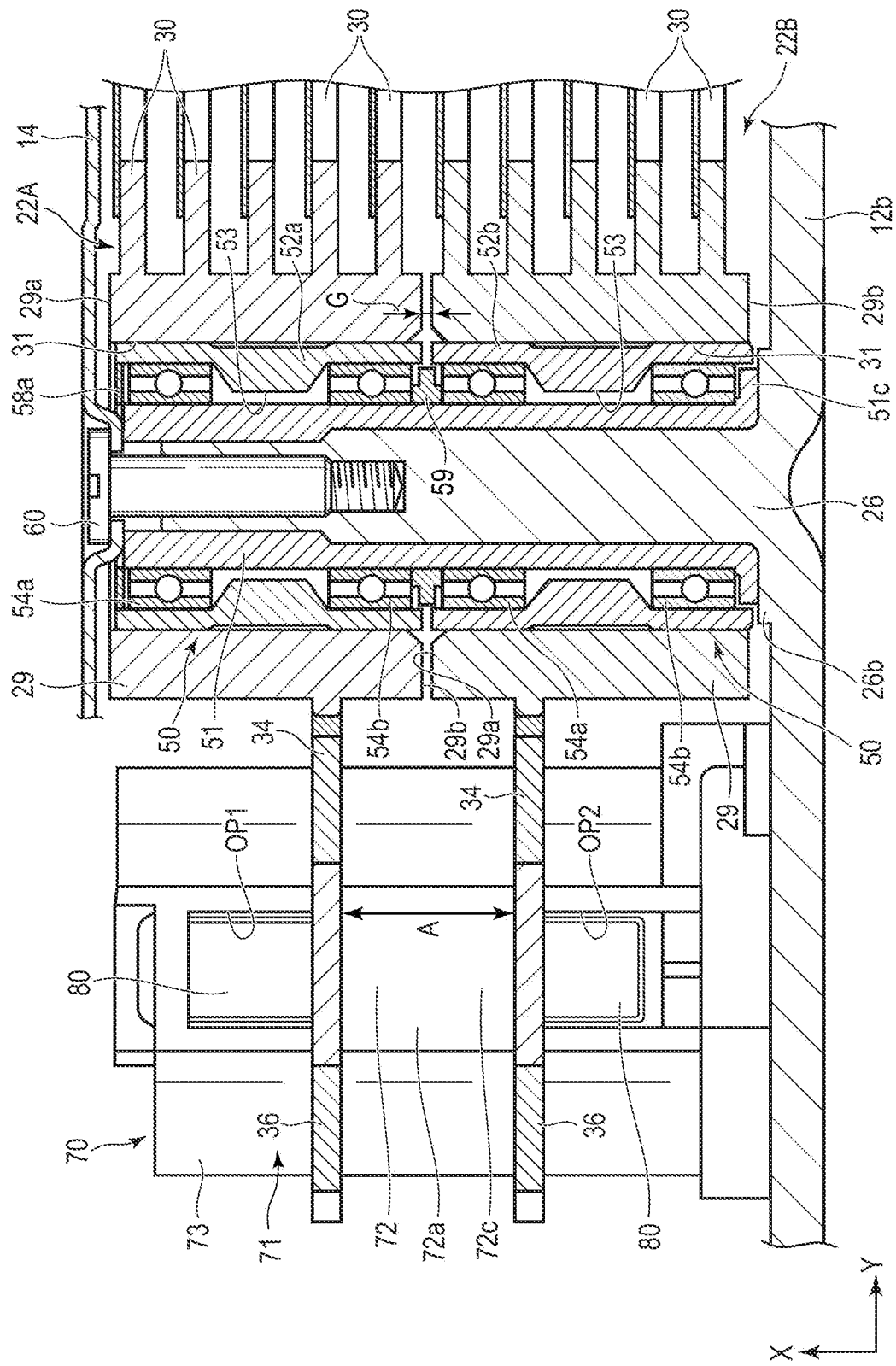
FIG. 4 is a cross-sectional view of an actuator block and a voice coil of the actuator assembly.

Next, the support structures of the first actuator assembly 22A and the second actuator assembly 22B will be described in detail. FIG. 4 is a cross-sectional view of the actuator assembly and the bearing portion. FIG. 4 further illustrates a positional relationship between the filter unit 70 and the actuator assemblies 22A and 22B.

Hereinafter, the components of the first actuator assembly 22 are described with "first" added thereto, and the components of the second actuator assembly 22 are described with "second" added thereto. As illustrated in FIG. 4, the support shaft 26 is provided upright on the bottom wall 12a of the base 12. In an example, the support shaft 26 is molded integrally with the bottom wall 12a and is provided upright to be substantially perpendicular to the bottom wall 12a. The support shaft 26 integrally includes an annular flange (pedestal) 26b provided on the outer periphery of the proximal end.

The first bearing unit 50 of the first actuator assembly 22A and the second bearing unit 50 of the second actuator assembly 22B have a common bearing shaft 51. The bearing shaft 51 is formed in a substantially hollow cylindrical shape, and has an annular flange 51c on the outer periphery of the lower end. The bearing shaft 51 is fitted around the support shaft 26 and extends coaxially with the support shaft 26. The axial length of the bearing shaft 51 is formed to be longer than the axial length of the support shaft 26. The flange 51c of the bearing shaft 51 is placed on a flange 26a of the support shaft 26. An axially upper end portion of the bearing shaft 51 extends upward beyond an axially upper end of the support shaft 26.

A fixing screw 60 is screwed into the upper end portion of the support shaft 26 through the top cover 14 and the inner hole of the bearing shaft 51. The head of the fixing screw 60 abuts on the axially upper end of the bearing shaft 51 through the top cover 14, and presses the bearing shaft 51 toward the pedestal 26b. As a result, the bearing shafts 51 of the first bearing unit 50 and the second bearing unit are attached and fixed at predetermined positions with respect to the support shaft 26.

Each of the first actuator block 29 and the second actuator block 29 has an upper end surface 29a and a lower end surface 29b extending perpendicularly to the support shaft 26. The inner hole 31 is formed to penetrate the actuator block 29, and is opened in the upper end surface 29a and the lower end surface 29b. In addition, the inner hole 31 is formed coaxially with the support shaft 26.

The first actuator block 29 is rotatably supported by the axial upper end portion of the bearing shaft 51 through the first bearing unit 50. The first bearing unit 50 includes a substantially cylindrical first sleeve 52a and a plurality of, for example, a pair of ball bearings 54a and 54b fitted between the first sleeve 52a and the bearing shaft 51. The ball bearings 54a and 54b are filled with a lubricant such as grease.

The first sleeve 52a has an axial length substantially equal to the height of the first actuator block 29. The outer diameter of the first sleeve 52a is formed to be substantially equal to the diameter of the inner hole 31. The inner diameter of the first sleeve 52a is formed to be larger than the outer diameter of the bearing shaft 51. The first sleeve 52a integrally has an annular convex portion 53 protruding from the axially intermediate portion of the inner peripheral surface toward the axial center.

The first sleeve 52a is fitted into the inner hole 31 of the first actuator block 29a and is fixed to the first actuator block 29a with an adhesive or the like. The first sleeve 52a is positioned coaxially with the inner hole 31, and the upper end and the lower end in the axial direction are substantially aligned with the upper end surface 29a and the lower end surface 29b of the first actuator block 29a.

One ball bearing 54a is arranged in the upper end portion of the first sleeve 52a in a state where the inner race is fitted to the outer peripheral surface of the bearing shaft 51 and the outer race is fitted to the inner peripheral surface of the first sleeve 52a. The other ball bearing 54b is arranged in the lower end portion of the first sleeve 52a in a state where the inner race is fitted to the outer peripheral surface of the bearing shaft 51 and the outer race is fitted to the inner peripheral surface of the first sleeve 52a. The convex portion 53 is positioned between the ball bearings 54a and 54b and functions as a spacer. An annular cap 58a is attached to the inner periphery of the upper end portion of the first sleeve 52a. The cap 58a faces the upper ball bearing 54a with a slight gap. The cap 58a functions as a cover that prevents scattering of grease from the ball bearing 54a.

The second actuator block 29 of the second actuator assembly 22B is rotatably supported by the proximal end side portion of the bearing shaft 51 through the second bearing unit 50. The second bearing unit 50 has substantially the same structure as the first bearing unit 50.

Specifically, the second bearing unit 50 includes a substantially cylindrical second sleeve 52b arranged coaxially around the bearing shaft 51, and a plurality of, for example, two ball bearings 54a and 54b fitted between the bearing shaft 51 and the second sleeve 52b.

The second sleeve 52b has an axial length substantially equal to the height of the second actuator block 29. The outer diameter of the second sleeve 52b is formed to be substantially equal to the diameter of the inner hole 31. The inner diameter of the second sleeve 52b is formed to be larger than the outer diameter of the bearing shaft 54. The second sleeve 52b integrally has an annular convex portion 53 protruding from the axially intermediate portion of the inner peripheral surface toward the axial center. The second sleeve 52b is fitted into the inner hole 31 of the second actuator block 29 and is fixed to the second actuator block 29 with an adhesive or the like. The second sleeve 52b is positioned coaxially with the inner hole 31, and the upper end and the lower end in the axial direction are substantially aligned with the upper end surface 29a and the lower end surface 29b of the second actuator block 29.

One ball bearing 54a is arranged in the upper end portion of the first sleeve 52a in a state where the inner race is fitted to the outer peripheral surface of the bearing shaft 54 and the outer race is fitted to the inner peripheral surface of the second sleeve 52b. The other ball bearing 54b is arranged in the lower end portion of the second sleeve 52b in a state where the inner race is fitted to the outer peripheral surface of the bearing shaft 54 and the outer race is fitted to the inner peripheral surface of the second sleeve 52b. The convex portion 53 is positioned between the ball bearings 54a and 54b and functions as a spacer. The second sleeve 52b and the second actuator block 29 are rotatably supported by the ball bearings 54a and 54b with respect to the bearing shaft 54 and the support shaft 26.

Between the first bearing unit 50 and the second bearing unit 50, a spacer ring 59 is fitted to the outer periphery of the bearing shaft 51. The spacer ring 59 is sandwiched between the lower ball bearing 54b of the first bearing unit 50 and the upper ball bearing 54a of the second bearing unit 50. The spacer ring 59 abuts on the inner race of the ball bearings 54b and 54a and faces the outer race with a gap. As described above, the first actuator assembly 22A and the second actuator assembly 22B are supported by the bearing shaft 51 and the support shaft 26 so as to be independently rotatable by the first bearing unit 50 and the second bearing unit 50, respectively. The lower end surface 29b of the first actuator block 29 and the upper end surface 29a of the second actuator block 29b face each other with a gap G therebetween.

As illustrated in FIG. 4, the support frame 34 and the voice coil 36 of the first actuator assembly 22A extend in a direction orthogonal to the support shaft 26. Similarly, the support frame 34 and the voice coil 36 of the second actuator assembly 22B extend in the direction orthogonal to the support shaft 26. The support frame 34 and the voice coil 36 of the second actuator assembly 22B face the support frame 34 and the voice coil 36 of the first actuator assembly 22A substantially in parallel at an interval in the axial direction of the support shaft 26. The boundary or the gap G between the first actuator block 29 and the second actuator block 29 is positioned between two sets of support frames 34 and voice coils 36.

Figure 5:
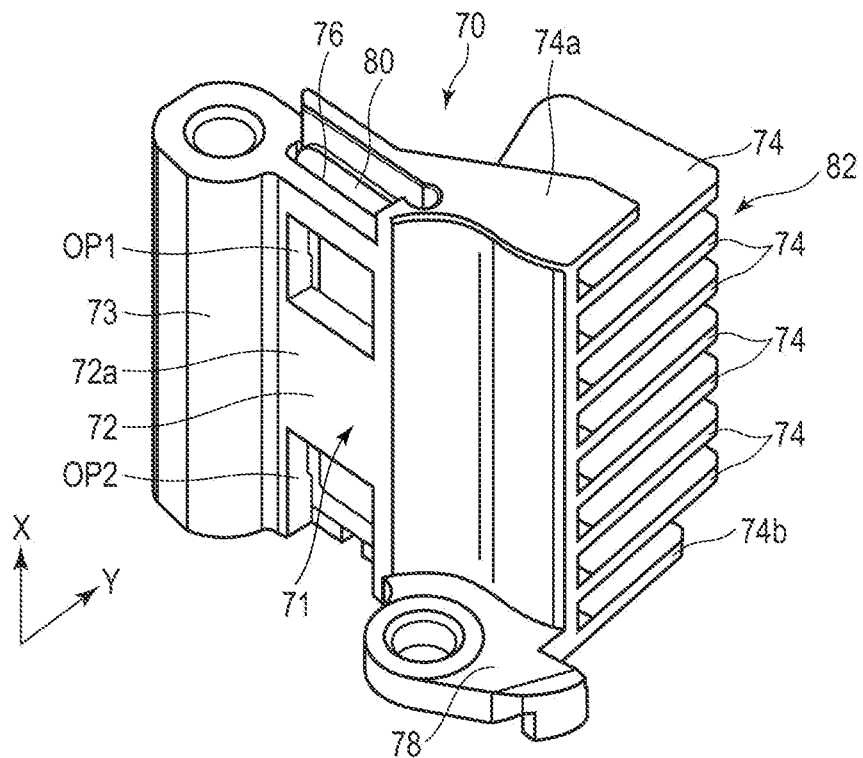
FIG. 5 is a perspective view of a filter unit as viewed from a filter side.
Figure 7:
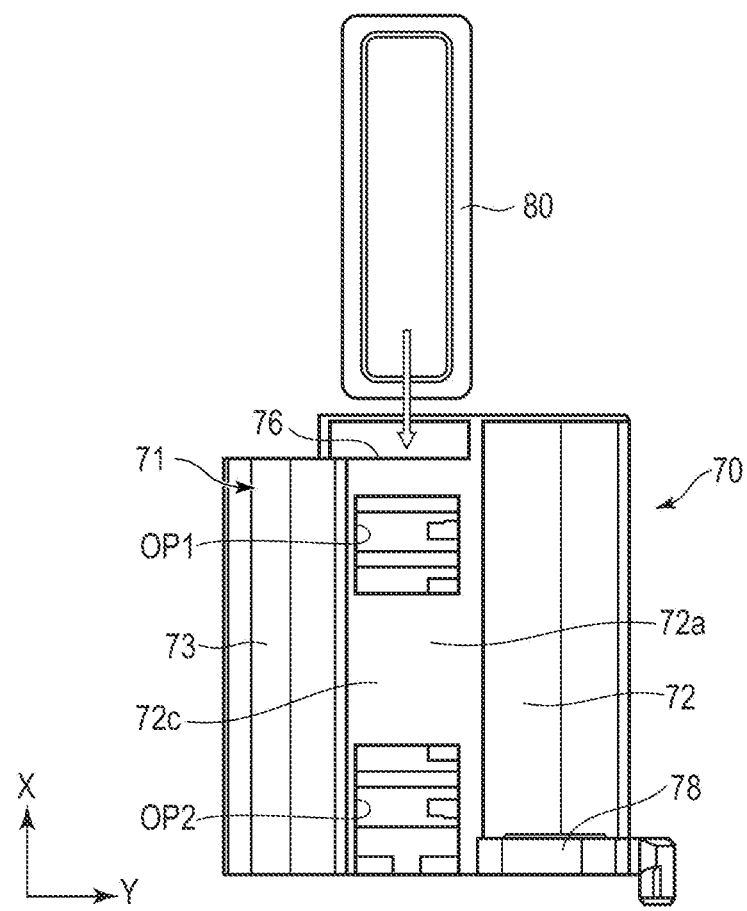
FIG. 7 is a front view illustrating a support and a filter of the filter unit.
Figure 8:
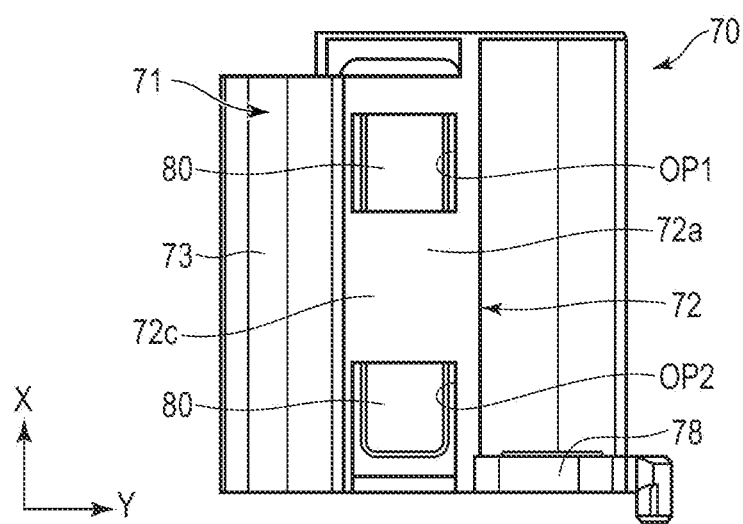
FIG. 8 is a front view of the filter unit in a state where the filter is mounted.

Next, the filter unit 70 will be described in detail. FIG. 5 is a perspective view of the filter unit according to this embodiment as viewed from one direction, FIG. 6 is a perspective view of the filter unit as viewed from the other direction, FIG. 7 is a side view illustrating a holder and a filter of the filter unit, and FIG. 8 is a side view of the filter unit in a state where the filter is mounted.

Figure 6:
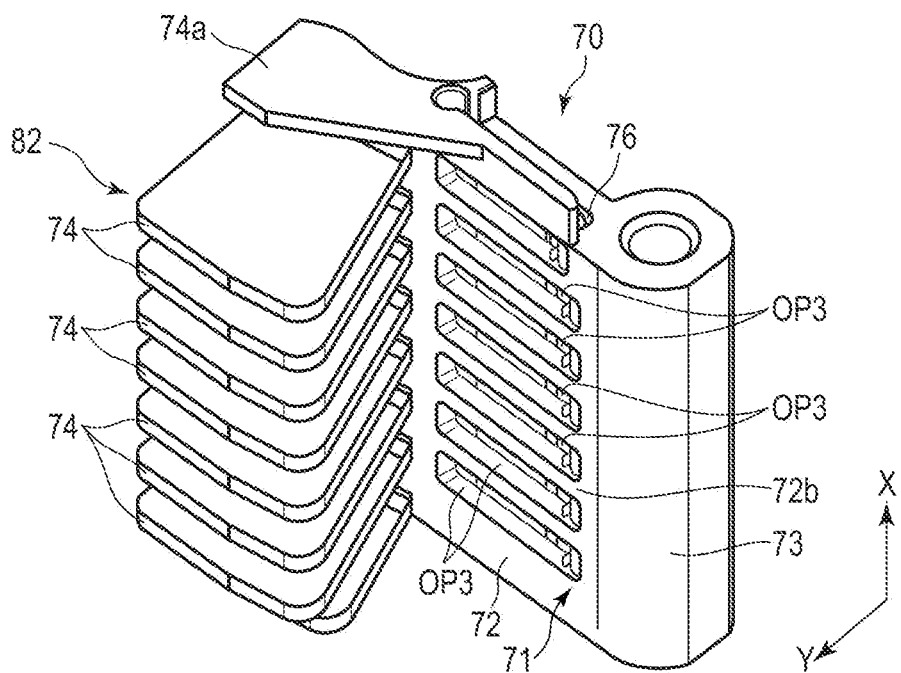
FIG. 6 is a perspective view of the filter unit as viewed from a spoiler side.

As illustrated in FIGS. 5 and 6, the filter unit 70 includes a holder 71 and a filter 80 mounted to the holder 71. In this embodiment, the filter unit 70 further includes a spoiler 82 including a plurality of blades 74. The holder 71 and the spoiler 82 are integrally molded using synthetic resin, metal, or the like.

The holder 71 integrally includes a holding wall portion 72 having a substantially flat rectangular parallelepiped shape, a support sleeve 73 provided on one side of the holding wall portion 72, and a bracket 78 protruding from the holding wall portion 72. When the axial direction of the support shaft 26 described above is defined as an X direction and the direction orthogonal to the X direction is defined as a Y direction, the holding wall portion 72 and the support sleeve 73 are provided to stand in the X direction. The holding wall portion 72 has a flat first main surface 72a and a flat second main surface 72b facing the first main surface substantially in parallel. A mounting slot 76 capable of housing the filter 80 is formed in the holding wall portion 72. The mounting slot 76 is positioned between the first main surface 72a and the second main surface 72b, and extends from the upper end to the lower end of the holding wall portion 72.

The holding wall portion 72 has a first ventilation opening OP1 and a second ventilation opening OP2 opened to the first main surface 72a and the mounting slot 76, respectively. In an example, the first ventilation opening OP1 and the second ventilation opening OP2 are formed in a rectangular shape. The first ventilation opening OP1 and the second ventilation opening OP2 are provided at an interval in the X direction. The first ventilation opening OP1 is provided on the upper end portion side of the first main surface 72a in the X direction, and the second ventilation opening OP2 is provided on the lower end portion side of the first main surface 72a. As a result, the wall portion where the first ventilation opening OP1 and the second ventilation opening OP2 are positioned functions as a closed shielding portion 72c.

The holding wall portion 72 has a plurality of, for example, seven third ventilation openings OP3 opened to the second main surface 72b and the mounting slot 76. Each of the third ventilation openings OP3 is a long hole extending in the Y direction, and is provided side by side in the X direction at intervals.

As illustrated in FIGS. 7 and 8, the filter 80 is formed in, for example, an elongated rectangular plate shape. In an example, the filter 80 is formed to have a length and a width substantially equal to the length of the mounting slot 76 in the X direction and the width thereof in the direction orthogonal to the X direction. The filter 80 is mounted in the mounting slot 76 and held in the mounting slot 76. The filter 80 is positioned to face the first ventilation opening OP1 and the second ventilation opening OP2, and covers the opening ends of the first ventilation opening OP1 and the second ventilation opening OP2 on the mounting slot 76 side. In addition, the filter 80 faces the seven third ventilation openings OP3 and closes the opening ends of the third ventilation openings OP3 on the mounting slot 76 side.

As will be described later, in the operating state of the HDD, a part of the air flow generated by the rotation of the magnetic disk 18 flows into the holder 71 from the third ventilation opening OP3 of the filter unit 70, passes through the filter 80, and then flows out to the side of the actuator assemblies 22A and 22B from the first ventilation opening OP1 and the second ventilation opening OP2. By passing through the filter particles in the air flow are captured by the filter 80.

As illustrated in FIGS. 5 and 6, the spoiler 82 includes a plurality of blades 74 extending from the second main surface 72b of the holder 71 in the Y direction, that is, in a direction perpendicular to the second main surface. The plurality of blades, for example, nine blades 74 are arranged substantially parallel with each other at predetermined intervals in the X direction. That is, each of the blades 74 extends substantially parallel with the surface of the magnetic disk 18.

As illustrated in FIG. 1, the filter unit 70 having the above configuration is arranged near the outer peripheral edge of the magnetic disk 18 on the upstream side of the actuator assemblies 22A and 22B in the rotation direction of the magnetic disk 18. That is, the filter unit 70 is arranged between the actuator assemblies 22A and 22B and the outer peripheral edge of the magnetic disk 18. A pivot (not illustrated) provided upright on the bottom wall 12a of the base 12 is inserted into the support sleeve 73 of the filter unit 70, and the bracket 78 is screwed to the bottom wall 12a. As a result, the filter unit 70 is fixed to the bottom wall 12a and is provided upright to be substantially perpendicular on the bottom wall 12a. The first main surface 72a of the holding wall portion 72 and the first and second ventilation openings OP1 and OP2 are positioned on the side of the actuator assemblies 22A and 22B, and the second main surface 72b of the holding wall portion 72 and the third ventilation opening OP3 are positioned on the side of the magnetic disk 18. Note that in an example, each of the plurality of third ventilation openings OP3 faces a gap between adjacent magnetic disks 18.

Except for the uppermost blade 74a and the lowermost blade 74b of the spoiler 82, each of the other plurality of blades 74 extends between two adjacent magnetic disks 18 and faces the outer periphery portion of the magnetic disk 18 with a gap. The uppermost blade 74a faces the upper surface of the uppermost magnetic disk 18 with a gap. The lowermost blade 74b faces the lower surface of the lowermost magnetic disk 18 with a gap.

The blades 74, 74a, and 74b of the spoiler 82 rectify the wind generated on the surface of the magnetic disk 18 to reduce the wind disturbance to the actuator assemblies 22A and 22B. As a result, the vibration of the actuator assemblies 22A and 22B can be suppressed, and the head positioning accuracy can be improved.

As illustrated in FIG. 4, in a state where the filter unit 70 is provided upright on the bottom wall 12a, the first ventilation opening OP1 of the holding wall portion 72 is positioned at a position higher than the plane on which the support frame 34 and the voice coil 36 of the first actuator assembly 22A extend in the X direction, and the second ventilation opening OP2 is positioned at a position lower than the plane on which the support frame 34 and the voice coil 36 of the second actuator assembly 22B extend. That is, the first ventilation opening OP1 and the second ventilation opening OP2 are arranged at positions vertically shifted from the boundary and the gap G between the first actuator assembly 22A and the second actuator assembly 22B in the X direction. In this embodiment, the first ventilation opening OP1 and the second ventilation opening OP2 are arranged at positions vertically shifted from a region A between two voice coils 36 in the X direction. As a result, the shielding portion 72c of the holding wall portion 72 faces the region A between two voice coils 36. On the other hand, the plurality of third ventilation openings OP3 of the filter unit 70 are directed to the side of the magnetic disks 18 and each face a region between the magnetic disks 18.

According to the HDD having the above configuration, in the operating state, a part of the air flow generated by the rotation of the magnetic disk 18 flows into the holder 71 from the third ventilation opening OP3 of the filter unit 70. Further, after passing through the filter 80, the air flow flows out from the first ventilation opening OP1 and the second ventilation opening OP2 to the side of the actuator assemblies 22A and 22B. By passing through the filter particles in the air flow are captured by the filter 80.

At this time, since the first ventilation opening OP1 and the second ventilation opening OP2 are shielded by the shielding portion 72c, the air flow having flowed in is shielded by the shielding portion 72c and flows out to the actuator assembly side only from the first ventilation opening OP1 and the second ventilation opening OP2. That is, the air flow does not flow out to the region A between the voice coils 36, and the high-speed air flow does not hit the gap G.

Figure 9:
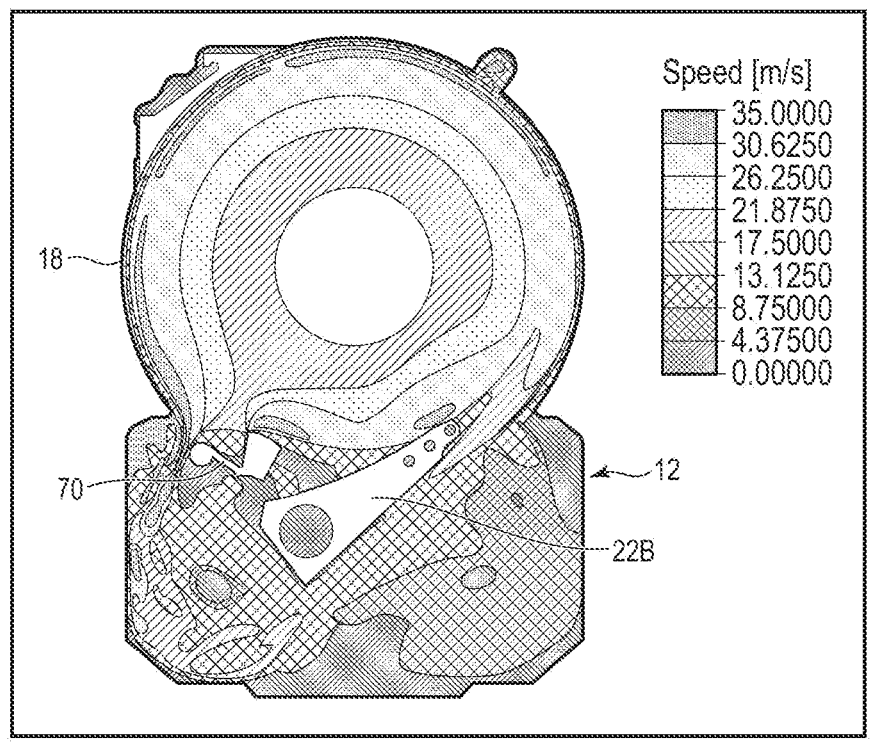
FIG. 9 is a view schematically illustrating an example of an air flow analysis result in the HDD.

FIG. 9 schematically illustrates an analysis result (flow speed) of the air flow in a planar region including the gap G of the actuator assembly in the HDD. From this drawing, it can be seen that the flow speed of the air flow near the gap G is low, and a high-speed air flow does not flow out toward the gap G. By adopting a configuration in which a high-speed air flow does not hit the gap G between the actuator assemblies 22A and 22B, it is possible to reduce or prevent scattering of contamination (the mist component, gas component, and the like of grease) into the housing from the gap G.

According to the HDD configured as described above according to the first embodiment, particles such as dust and dirt generated in the housing can be captured by the filter unit 70, and adhesion of the particles to the magnetic disk 18 can be reduced. At the same time, regardless of the configuration in which the first actuator assembly 22A and the second actuator assembly 22B that can be independently driven are arranged to overlap the common support shaft 26, it is possible to reduce contamination (the mist component, gas component, and the like of grease) scattering into the housing from the boundary portion (gap) between the first and second actuator assemblies. This makes it possible to prevent the mist component and the gas component of the grease from scattering on the magnetic disk and to suppress the adhesion of the grease to the magnetic disk or the magnetic head. Therefore, it is possible to prevent the occurrence of insufficient flying of the magnetic head, head crash, and data read/write failure due to grease, and improve the reliability of the HDD.

In this embodiment, by molding the filter unit 70 and the spoiler 82 as an integrated component, it is possible to obtain a disk device capable of reducing the number of components and simplifying assembly. Next, an HDD according to a modification of the first embodiment and another embodiment will be described. In the modifications and other embodiments described below, the same portions as those in the first embodiment described above are designated by the same reference numerals, and detailed description thereof will be omitted or simplified. Portions different from those in the first embodiment will be described mainly.

(First Modification)

Figure 10:
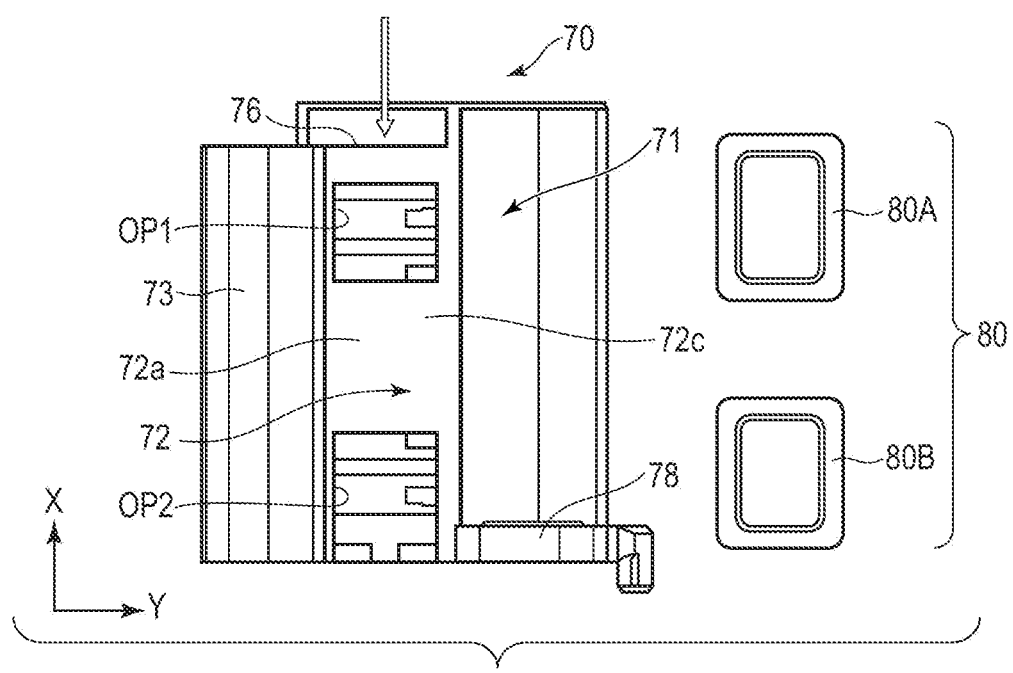
FIG. 10 is a front view of a filter unit and a filter according to a first modification.

FIG. 10 is a front view illustrating a support and a filter of a filter unit according to a first modification. As illustrated in the drawing, the filter 80 is not limited to a single filter, and two independent filters 80A and 80B may be used. One filter 80B is mounted in the mounting slot 76 and held at a position facing the second ventilation opening OP2. The other filter 80A is mounted in the mounting slot 76 and held at a position facing the first ventilation opening OP2.

(Second Modification)

Figure 11:
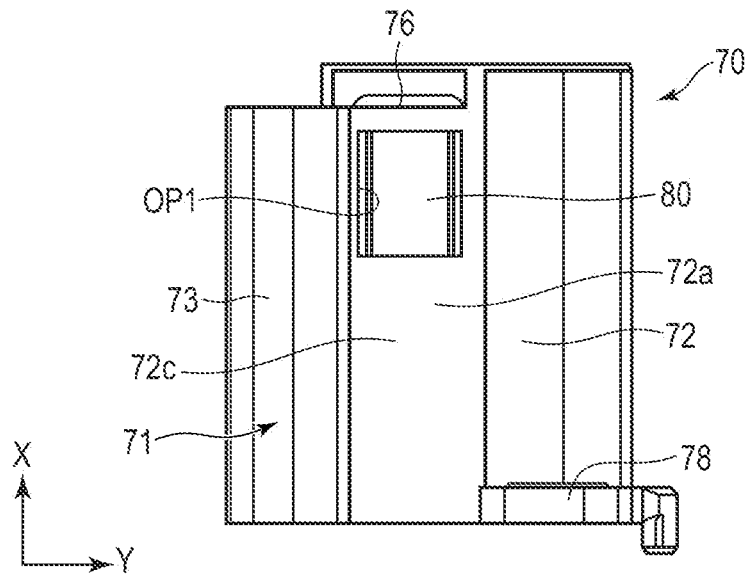
FIG. 11 is a front view of a filter unit and a filter according to a second modification.

FIG. 11 is a front view of a filter unit according to a second modification. As illustrated in the drawing, the number of ventilation openings on the outflow side of the filter unit 70 is not limited to a plurality, and may be one. In an example, the first ventilation opening OP1 is formed in the holder 71 of the filter unit 70, and is positioned to be shifted upward in the X direction with respect to the gap G (boundary) between the first actuator assembly 22A and the second actuator assembly 22B. The portion of the second ventilation opening is closed to form the shielding portion 72c.

In the second modification, the ventilation opening OP is not limited to be provided not only on the upper side in the X direction with respect to the gap G, and may be provided at a position shifted downward in the X direction.

In both of the first modification and the second modification described above, the operation and effect similar to those of the first embodiment described above can be obtained.

Second Embodiment

Figure 12:
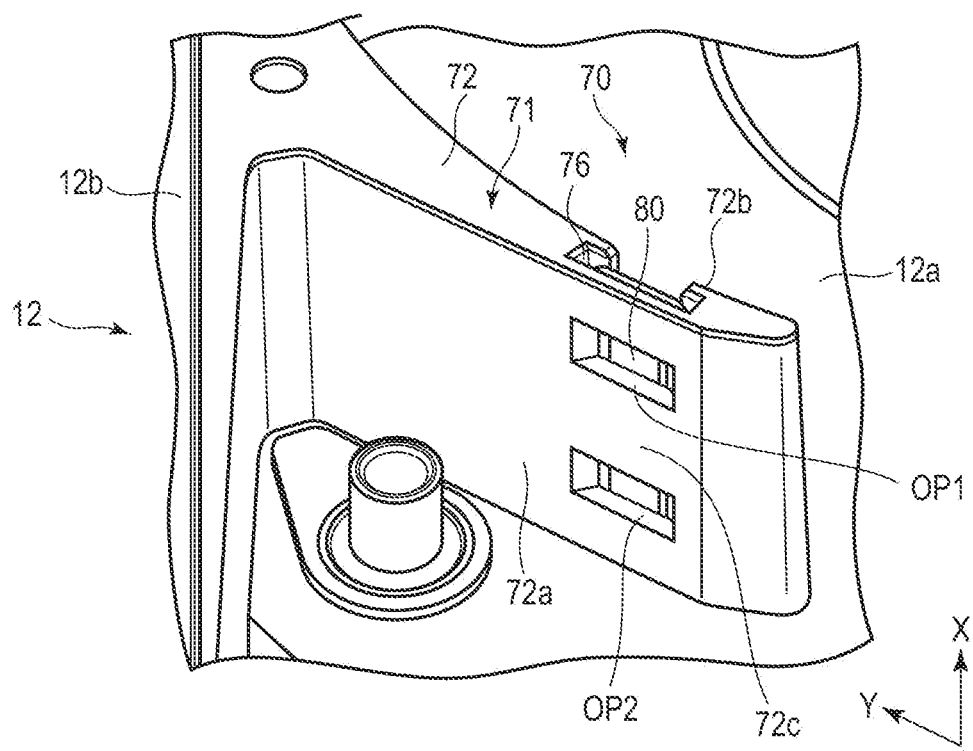
FIG. 12 is a perspective view illustrating a filter unit of a hard disk drive (HDD) according to a second embodiment.
Figure 13:
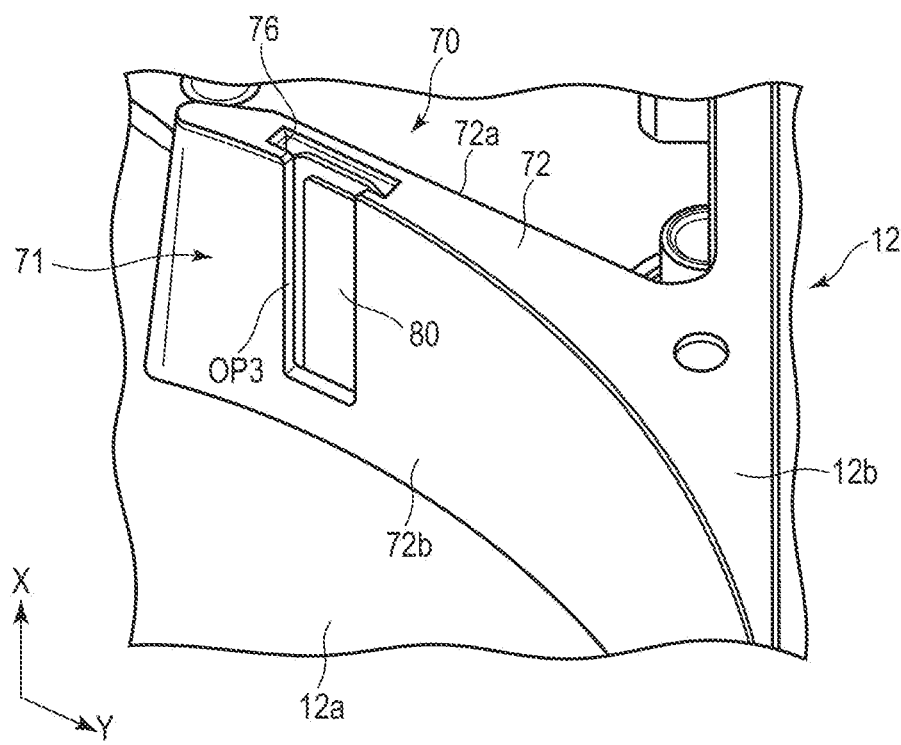
FIG. 13 is a perspective view illustrating a filter unit of a hard disk drive (HDD) according to the second embodiment.

FIG. 12 is a perspective view illustrating a base portion of an HDD according to a second embodiment, and FIG. 13 is a perspective view of the base portion as viewed from a different direction.

As illustrated in the drawing, according to the second embodiment, a holder 71 of a filter unit 70 is molded integrally with a base 12 of a housing 10. In an example, a holding wall portion 72 of the holder 71 is provided upright to be substantially perpendicular to a bottom wall 12a of the base 12 and is connected to a side wall 12b of the base 12. The holding wall portion 72 is formed at the same height as the side wall 12b, and extends from the side wall 12b toward actuator assemblies 22A and 22B along the outer peripheral edge of a magnetic disk 18.

The holding wall portion 72 has a first main surface 72a facing the first and second actuator assemblies 22A and 22B, a second main surface 72b positioned on the side opposite to the first main surface 72a and facing the outer peripheral edge of the magnetic disk 18, and a mounting slot 76 capable of housing a filter 80. The mounting slot 76 is positioned between the first main surface 72a and the second main surface 72b, and extends in the X direction from the upper end to the lower end of the holding wall portion 72.

The holding wall portion 72 has a first ventilation opening OP1 and a second ventilation opening OP2 opened to the first main surface 72a and the mounting slot 76, respectively. In an example, the first ventilation opening OP1 and the second ventilation opening OP2 are formed in a rectangular shape. The first ventilation opening OP1 and the second ventilation opening OP2 are provided at an interval in the X direction. The first ventilation opening OP1 is provided on the upper end portion side of the first main surface 72a in the X direction, and the second ventilation opening OP2 is provided on the lower end portion side of the first main surface 72a. As a result, the wall portion where the first ventilation opening OP1 and the second ventilation opening OP2 are positioned functions as a closed shielding portion 72c.

The holding wall portion 72 has the third ventilation opening OP3 opened in the second main surface 72b and the mounting slot 76. The third ventilation opening OP3 extends in the X direction from the upper end to the vicinity of the lower end of the holding wall portion 72. The third ventilation opening OP3 has a width narrower than the width of the mounting slot 76 (the width in the direction orthogonal to the X direction).

The filter 80 is formed in, for example, an elongated rectangular plate shape. In an example, the filter 80 is formed to have a length and a width substantially equal to the length of the mounting slot 76 in the X direction and the width thereof in the direction orthogonal to the X direction. The filter 80 is positioned to face the first ventilation opening OP1 and the second ventilation opening OP2, and covers the opening ends of the first ventilation opening OP1 and the second ventilation opening OP2 on the mounting slot 76 side. In addition, the filter 80 faces the third ventilation opening OP3 and closes the opening end of the third ventilation opening OP3 on the mounting slot 76 side.

In a state where the first actuator assembly 22A and the second actuator assembly 22B are installed on the base 12, the first ventilation opening OP1 of the holding wall portion 72 is positioned at a position higher than the plane in which a support frame 34 and a voice coil 36 of the first actuator assembly 22A extend in the X direction, and the second ventilation opening OP2 is positioned at a position lower than the plane in which the support frame 34 and the voice coil 36 of the second actuator assembly 22A extend. That is, the first ventilation opening OP1 and the second ventilation opening OP2 are arranged at positions vertically shifted from the boundary and the gap G between the first actuator assembly 22A and the second actuator assembly 22B in the X direction. In this embodiment, a first ventilation opening OP1 and a second ventilation opening OP2 are arranged at positions vertically shifted from a region A (see FIG. 4) between two voice coils 36 in the X direction. The shielding portion 72c of the holding wall portion 72 faces the region A between two voice coils 36.

In the second embodiment, the other configurations of the HDD are the same as those of the HDD according to the first embodiment described above. However, in the second embodiment, a spoiler 82 formed integrally with the holder 71 of the filter unit 70 is omitted.

Also in the HDD according to the second embodiment having the above configuration, the operation and effect similar to those of the HDD according to the first embodiment described above can be obtained. That is, according to the HDD according to the second embodiment, particles such as dust and dirt generated in the housing can be captured by the filter unit 70, and adhesion of the particles to the magnetic disk 18 can be reduced. At the same time, regardless of the configuration in which the first actuator assembly 22A and the second actuator assembly 22B that can be independently driven are arranged to overlap a common support shaft 26, it is possible to reduce contamination (the mist component, gas component, and the like of grease) scattering into the housing from the gap between the actuator assemblies. This makes it possible to prevent the mist component and the gas component of the grease from scattering on the magnetic disk and to suppress the adhesion of the grease to the magnetic disk or the magnetic head.

Therefore, it is possible to prevent the occurrence of insufficient flying of the magnetic head, head crash, and data read/write failure due to grease, and improve the reliability of the HDD. Furthermore, in this embodiment, by forming the filter unit 70 as a component integrated with the housing, it is possible to obtain a disk device capable of reducing the number of components and simplifying assembly.

Third Embodiment

Figure 14:
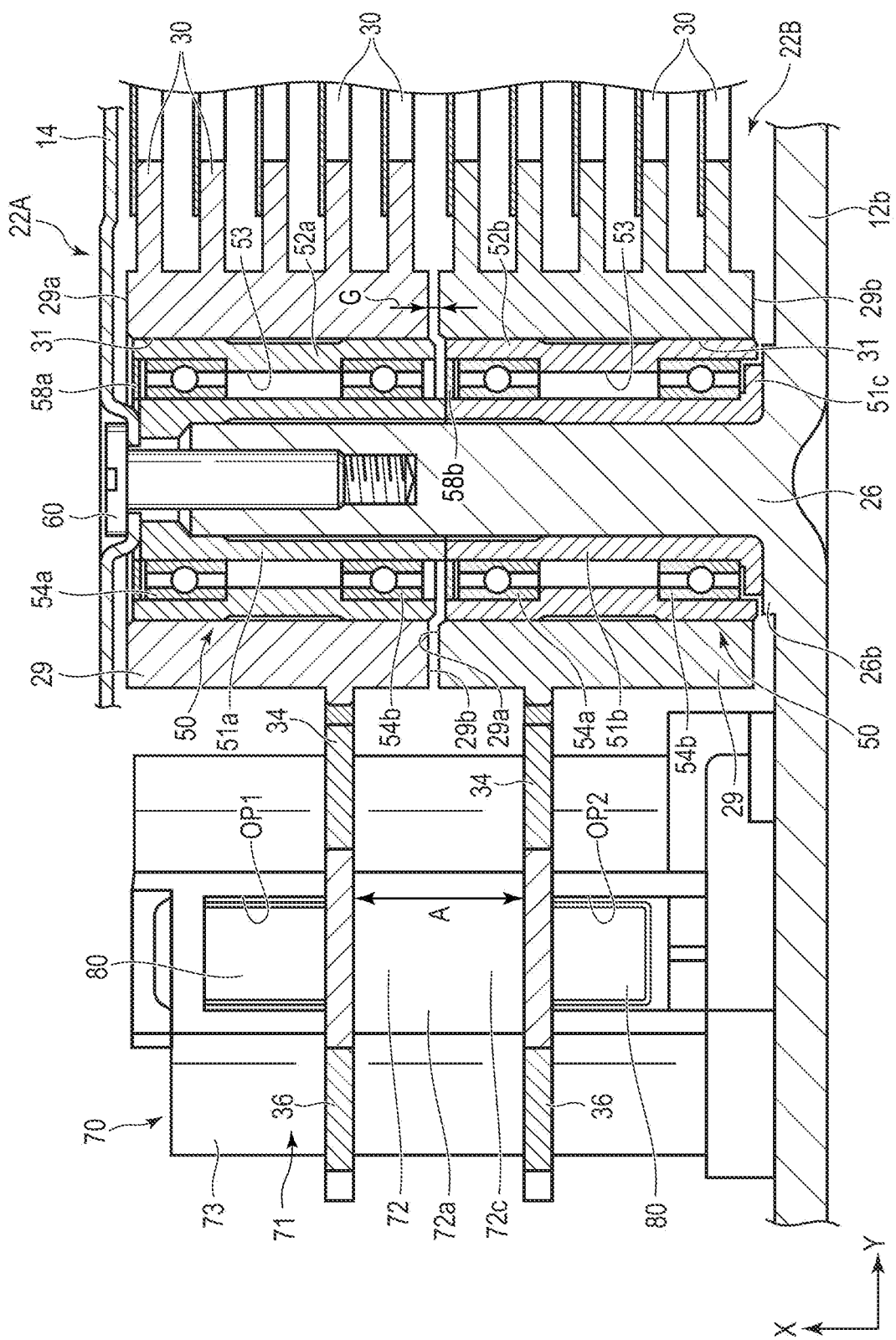
FIG. 14 is a cross-sectional view of an actuator block and a voice coil of an actuator assembly according to a modification.

FIG. 14 is a cross-sectional view illustrating a bearing portion of an actuator assembly of an HDD according to a third embodiment. In the first embodiment described above, a first bearing unit and a second bearing unit have a common bearing shaft 51, but the bearing shaft is not limited to be integrated, and may be separated into the first bearing shaft and the second bearing shaft.

As illustrated in FIG. 14, according to the third embodiment, a first bearing unit 50 of a first actuator assembly 22A and a second bearing unit 50 of a second actuator assembly 22B are configured as independent bearing units separated from each other, and are separately mounted to a first actuator block 29 and a second actuator block 29, respectively.

The first bearing unit 50 supporting the first actuator assembly 22A includes a substantially cylindrical first bearing shaft 51a, a substantially cylindrical first sleeve 52a coaxially arranged around the first bearing shaft 51a, and a plurality of bearings, for example, two ball bearings 54a and 54b fitted between the first bearing shaft 51a and the first sleeve 52a.

The first sleeve 52a is slightly arranged in one axial direction, here, upward with respect to the first bearing shaft 51a. As a result, the upper end of the first bearing shaft 51a is positioned to be shifted slightly downward from the upper end of the first sleeve 52a, and the lower end of the first bearing shaft 51a slightly protrudes downward from the lower end of the first sleeve 52a.

The first sleeve 52a is fitted into the inner hole 31 of the first actuator block 29 and is fixed to the first actuator block 29 with an adhesive or the like. The first sleeve 52a is positioned coaxially with the inner hole 31, and the upper end and lower end in the axial direction are substantially aligned with the upper end surface 29a and the lower end surface 29b of the first actuator block 29. The axially lower end portion of the first bearing shaft 51a protrudes slightly downward from the lower end surface 29b of the first actuator block 29.

The first bearing unit 50 mounted to the first actuator block 29 is attached to the support shaft 26 by fitting the first bearing shaft 51a to the upper end portion of the support shaft 26.

On the other hand, the second bearing unit 50 supporting the second actuator assembly 22B is rotatably attached to the proximal end side portion of the support shaft 26.

Specifically, the second bearing unit 50 includes a substantially cylindrical second bearing shaft 51b, a substantially cylindrical second sleeve 52b coaxially arranged around the second bearing shaft 51b, and a plurality of bearings, for example, two ball bearings 54a and 54b fitted between the second bearing shaft 51b and the second sleeve 52b.

The second hollow shaft 51b integrally includes an annular flange 51c provided on the outer periphery at the axially lower end. The second hollow shaft 51b is fitted to the outer peripheral surface of the support shaft 26, and the flange 51c abuts on the pedestal 26b of the support shaft 26. The second sleeve 52b is fitted into the inner hole 31 of the second actuator block 29 and is fixed to the second actuator block 29 with an adhesive or the like. The second sleeve 52b is positioned coaxially with the inner hole 31, and the upper end and the lower end in the axial direction are substantially aligned with the upper end surface 29a and the lower end surface 29b of the second actuator block 29. An annular cap 58b is attached to the inner periphery of the upper end portion of the second sleeve 52b.

The second actuator assembly 22B is rotatably supported by the proximal end side portion of the support shaft 26 through the second bearing unit 50. That is, the proximal end side portion of the support shaft 26 is inserted to the second bearing shaft 51b of the second bearing unit 50. The second bearing shaft 51b is fitted to the outer peripheral surface of the support shaft 26, and the flange 51c abuts on the pedestal 26b of the support shaft 26. The second sleeve 52b and the second actuator block 29 are rotatably supported by the ball bearings 54a and 54b with respect to the second bearing shaft 51b and the support shaft 26.

The first actuator assembly 22A described above is rotatably supported by the distal end side portion of a support shaft 26 through the first bearing unit 50. The distal end side portion of the support shaft 26 is inserted to the first bearing shaft 51a of the first bearing unit 50. The first bearing shaft 51a is fitted to the outer peripheral surface of the support shaft 26, and the axially upper end portion of the first bearing shaft 51a extends upward beyond the distal end of the support shaft 26.

The axially lower end of the first bearing shaft 51a abuts on the axially upper end of the second bearing shaft 51b. A fixing screw 60 is screwed into the upper end portion of the support shaft 26 through the inner hole of the first bearing shaft 51a. The head of the fixing screw 60 abuts on the axially upper end of the first bearing shaft 51a through the top cover 14, and presses the first bearing shaft 51a and the second bearing shaft 51b toward the pedestal 26b.

As a result, the first bearing unit 50 and the second bearing unit 50 are attached and fixed at predetermined positions with respect to the support shaft 26. When the lower end of the first hollow shaft 51a abuts on the upper end of a second hollow shaft 51b, the first actuator assembly 22A is positioned at a predetermined position with respect to the second actuator assembly 22B. That is, the first actuator assembly 22A and the second actuator assembly 22B are positioned in a state where a predetermined gap G is formed between the lower end surface 29b of the first actuator block 29 and the upper end surface 29a of the second actuator block 29.

In the third embodiment, the other configurations of the HDD are the same as those of the HDD according to the first embodiment described above. Also in the HDD according to the third embodiment having the above configuration, the operation and effect similar to those of the HDD according to the first embodiment described above can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the filter unit is not limited to have the configuration integrally including the spoiler, and may be configured separately from the spoiler. In addition, a shroud may be provided instead of the spoiler.

The multi-actuator assembly is not limited to two of the first and second actuator assemblies, and three or more actuator assemblies may be rotatably supported on the common support shaft. The number of magnetic disks is not limited to nine, and may be eight or less or ten or more. It is sufficient if the number of head suspension assemblies and the number of magnetic heads are also increased or decreased according to the number of magnetic disks installed. The materials, shapes, sizes, and the like of the elements configuring the disk device are not limited to those in the above-described embodiment, but may be variously changed as necessary.

What is claimed is:

1. A disk device comprising:
   a plurality of rotatable magnetic disks;
   a first actuator assembly which is rotatably supported on a pivot through a first bearing unit;
   a second actuator assembly which is rotatably supported on the pivot through a second bearing unit and provided side by side with the first actuator assembly in an axial direction of the pivot; and
   a filter unit which is provided between the magnetic disks and the first and second actuator assemblies, wherein
   the filter unit comprises
   a holder including a shielding portion facing a boundary portion between the first actuator assembly and the second actuator assembly and a ventilation opening provided at a position spaced apart from the boundary portion in the axial direction, and a filter held by the holder and facing the ventilation opening.

2. The disk device of claim 1, wherein
   the holder includes a first main surface facing the first actuator assembly and the second actuator assembly, a second main surface facing the magnetic disks, a mounting slot provided between the first main surface and the second main surface, the ventilation opening opened in the first main surface and the mounting slot, and a third ventilation opening opened in the second main surface and the mounting slot, and the filter is arranged in the mounting slot.

3. The disk device of claim 2, wherein
   the ventilation opening of the holder includes a first ventilation opening and a second ventilation opening opened in the first main surface and the mounting slot, respectively, and
   the first ventilation opening and the second ventilation opening are spaced apart from the boundary portion in the axial direction and spaced apart from each other in the axial direction.

4. The disk device of claim 1, wherein
   the first actuator assembly comprises a first actuator block rotatably supported on the pivot by the first bearing unit, a first suspension assembly extending from the first actuator block in a first direction, a support frame extending from the first actuator block in a second direction opposite to the first direction, and a first voice coil supported by the support frame,
   the second actuator assembly comprises a second actuator block rotatably supported on the pivot by the second bearing unit, a second suspension assembly extending from the second actuator block in the first direction, a support frame extending from the second actuator block in the second direction, and a second voice coil supported by the support frame, and
   the ventilation opening is provided apart from a region between the first voice coil and the second voice coil in the axial direction.

5. The disk device of claim 4, wherein
   the ventilation opening of the holder includes a first ventilation opening and a second ventilation opening, and
   the first ventilation opening and the second ventilation opening are spaced apart from the region in the axial direction and spaced apart from each other in the axial direction.

6. The disk device of claim 1, further comprising a housing which includes a bottom wall and a side wall standing along a peripheral edge portion of the bottom wall, wherein
   the holder is provided upright on the bottom wall.

7. The disk device of claim 1, further comprising a housing which has a bottom wall and a side wall provided upright along a peripheral edge portion of the bottom wall, wherein
   the holder includes a holding wall portion molded integrally with the bottom wall or the side wall.

8. The disk device of claim 1, wherein
   the filter unit includes a spoiler having a plurality of blades extending from the holder and facing surfaces of the magnetic disks.

* * * * *